United States Patent [19]
DeLisle et al.

[11] Patent Number: 5,437,705
[45] Date of Patent: Aug. 1, 1995

[54] DEVICE AND PROCESS FOR THE RECOVERY OF CADMIUM AND NICKEL

[75] Inventors: Ralph J. DeLisle; Harold E. Martin, both of Gainesville; Amos Wilkerson, Alachua, all of Fla.

[73] Assignee: Eveready Battery Company, Inc., St. Louis, Mo.

[21] Appl. No.: 303,126

[22] Filed: Sep. 7, 1994

Related U.S. Application Data

[63] Continuation of Ser. No. 5,705, Jan. 19, 1993, abandoned.

[51] Int. Cl.$^6$ ............................................. C22B 7/00
[52] U.S. Cl. .................................. 75/403; 75/628; 75/669; 266/87; 266/148; 266/157; 266/205
[58] Field of Search .................. 75/403, 628, 669; 266/87, 148, 157, 205

[56] References Cited

U.S. PATENT DOCUMENTS

| | | | |
|---|---|---|---|
| 2,262,164 | 11/1941 | Brown | 75/71 |
| 4,401,463 | 8/1983 | Melin et al. | 75/669 |
| 4,511,541 | 4/1985 | Bierman | 423/100 |
| 4,675,048 | 6/1987 | Maillet | 75/10.14 |
| 4,793,933 | 12/1988 | Rostoker | 210/710 |
| 5,004,496 | 4/1991 | Aune | 75/10.28 |
| 5,120,409 | 6/1992 | Hanulik | 204/114 |
| 5,120,409 | 6/1992 | Hanulik | 204/105 |
| 5,199,975 | 4/1993 | Gunjishima et al. | 75/401 |

FOREIGN PATENT DOCUMENTS 2014102 4/1970 France.

Primary Examiner—Melvyn Andrews
Attorney, Agent, or Firm—Robert W. Welsh; Richard C. Cooper

[57] ABSTRACT

A process and device for recovering cadmium and nickel metals from Ni-Cd battery and processing scrap material containing nickel, cadmium, iron and other substances are disclosed. The process includes depositing the scrap material in a furnace and adding an effective amount of an oxygen getter in the furnace to prevent oxide formation. Argon or nitrogen gas is introduced and maintained in the atmosphere of the furnace. The furnace is then heated for an effective period of time to evaporate free water. The temperature of the furnace is then increased and maintained to approximately 500°–800° C. for an effective period of time to volatilize molecular water and non-metallic substances. The temperature of the furnace is then further raised to greater than approximately 900° C. for an effective period of time to vaporize cadmium from the scrap material. The vaporized cadmium is directed to a chamber connected with the furnace and is condensed and solidified in a mold disposed within the chamber by decreasing the temperature of the cadmium vapor. The solidified cadmium is then recovered, and a nickel-iron residue is also recovered from inside the furnace.

25 Claims, 1 Drawing Sheet

DEVICE AND PROCESS FOR THE RECOVERY OF CADMIUM AND NICKEL

This is a continuation of application Ser. No. 08/005,705 filed on Jan. 19, 1993, now abandoned.

BACKGROUND OF THE INVENTION

1. Field of The Invention

The present invention relates generally to the recycling of nickel-cadmium batteries and, more particularly, to the recovery of metals from nickel cadmium battery scrap, unused Ni-Cd electrode materials, nickel cadmium battery process residues and the like. Specifically, the present invention relates to a simplified pyrometallurgical recovery process and device for recovering cadmium and nickel metal from scrap material containing the same.

2. Description of The Prior Art

Nonrechargeable, primary alkaline cells have long been a principal source for portable battery power in devices such as flashlights, tape recorders, calculators, radios and the like. Unfortunately, environmental disposal problems have made such cells less desirable and have provided a major impetus for the development of rechargeable secondary cell technology. To date, a principal rechargeable cell arrangement generally includes cells using cadmium and nickel. Unfortunately, these cells eventually do wear out and must themselves be disposed of, thus leading to additional environmental concerns.

Used electrical storage batteries contain metals whose recovery may be advantageous from a financial point of view as well as from an environmental position. The metals, as previously indicated, which are principally of interest for recovery are cadmium and nickel. There is a significant additional environmental interest in preventing cadmium from being released into the environment by arbitrary and indiscriminate scrapping or throwing away of batteries in landfills and the like. From various view-points, therefore, there is a significant desire to insure that used and scrapped Ni-Cd batteries are dealt with in a controlled and safe manner.

During nickel-cadmium battery manufacture, the various process residues from the manufacturing technology also contain nickel and cadmium as well as cobalt, other metals and oxides, hydroxides, hydrates and other compounds. The recycling or reuse of metals such as cadmium and nickel and certain of such process residues is also of interest.

Some prior techniques which have been previously utilized for recovering cadmium and other metals include chemical techniques as disclosed in U.S. Pat. No. 4,511,541. In addition, U.S. Pat. No., 4,793,933 discloses a process for extracting metals from waste treatment sludges utilizing both heat and chemical processing techniques.

U.S. Pat. Nos. 4,401,463 and 4,675,048 both disclose processes for recovering metals, and in particular nickel and cadmium, from electric storage batteries utilizing electrothermal processes. However, these processes are somewhat complex and require numerous processing stages and steps requiring in turn a wide variety of equipment interaction. In particular, U.S. Pat. No. 4,401,463 requires, by way of example, the transferring of materials to a variety of different locations for each of a variety of different steps.

Therefore, prior art techniques for recovering metals from scrap nickel-cadmium batteries as well as process residues have remained complicated and costly. Consequently, there is still a need for a simple yet effective process and technique for recovering cadmium and nickel metals from scrap materials containing the same for both environmental purposes as well as economical recycling purposes.

SUMMARY OF THE INVENTION

Accordingly, it is one object of the present invention to provide a process for recycling nickel-cadmium batteries.

It is another object of the present invention to provide a process and device for recovering cadmium and nickel metal from spent nickel-cadmium batteries as well as process residues and unused electroplate materials.

Yet another object of the present invention is to provide a pyrometallurgical process and device for recovering metals from rechargeable batteries prior to disposal.

To achieve the foregoing and other objects and in accordance with the purpose of the present invention, as embodied and broadly described herein, a process and device is provided for recovering cadmium and nickel metal from Ni-Cd battery and process scrap material containing nickel, cadmium, iron and other substances. The process includes depositing the scrap material in a furnace and adding an effective amount of an oxygen getter in the furnace to prevent oxide formation. Argon or nitrogen gas is then introduced into the atmosphere of the furnace and maintained therein. The furnace is then heated for an effective period of time to evaporate free water. The temperature of the furnace is then increased and maintained at approximately 500°–800° C. for an effective period of time to volatilize molecular water and non-metallic substances. The temperature is then further raised to approximately greater than 900° for an effective period of time to vaporize cadmium from the scrap material. The vaporized cadmium is directed to a chamber connected to the furnace, and the cadmium is then condensed and solidified in a mold disposed within the chamber by decreasing temperature of the cadmium vapor within the chamber. The solidified cadmium is then recovered, and a nickel-iron residue is also recovered from inside the furnace.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENTS

Figure 1:
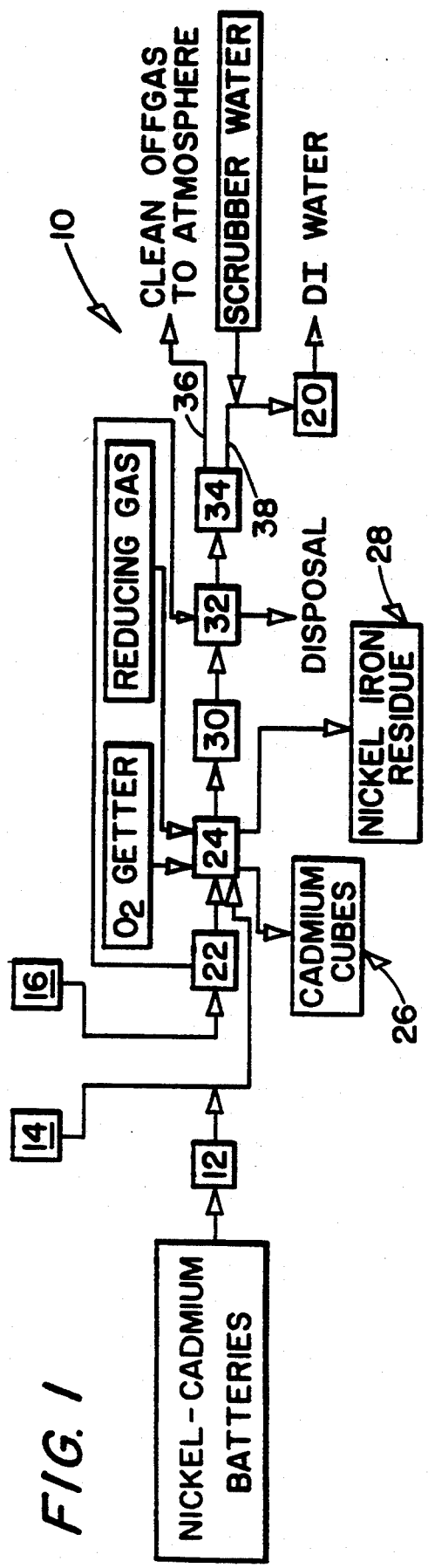
FIG. 1 is a flow diagram illustrating the steps of the process of the present invention.
Figure 2:
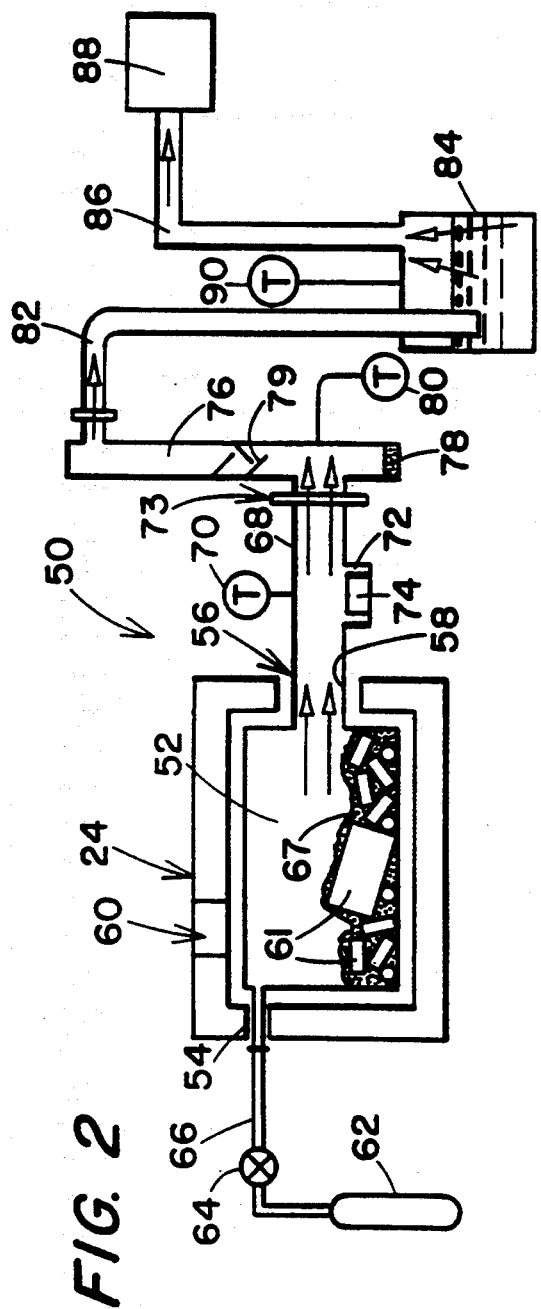
FIG. 2 is a schematic of a device constructed in accordance with the present invention.

The pyrometallurgical metal recovery process of the present invention removes all cadmium metal from nickel-cadmium cell scrap as well as from metallic hydroxide sludges, unused positive and negative electrode materials, process residues and the like. FIGS. 1 and 2 illustrate, respectively, both the process steps as well as the device utilized to achieve this recovery. In general, the process of the invention achieves cadmium metal recovery by vaporizing cadmium from the feedstock and condensing it from vapor to a liquid then to a solid metal in a controlled atmosphere. The resultant cadmium product is as pure as that metal purchased from cadmium nitrate sources and meets all specifications for cadmium use and electrode manufacturing for nickel-cadmium batteries.

The overall waste products of the process of the invention include water, which is processed through a standard waste water treatment system, a baghouse dust which will be disposed of, and dry solids which contains high levels of nickel which can be sold to metal refineries for nickel content, as well as the cadmium as discussed above.

Referring now to FIG. 1, unused as well as spent nickel-cadmium batteries are preferably shredded utilizing any known shredding technique in order to reduce the batteries to a smaller, more manageable size. The shredding occurs at step 12 of the overall process 10. In addition, plain nickel cadmium electrodes 14, which have been unused in the processing of the batteries, as well as Ni-Cd battery manufacturing process residues 16, which can include filter cakes as described below, are all directed to a retort furnace 24. The manufacturing process residues 16, however, are first dried by directing them to a dryer 22 and then to the retort furnace 24. Any standard retort furnace with variable temperature control capability arrangements can be utilized with the process and device of the present invention.

Once the feedstock has been placed within the furnace 24, the feedstock is exposed to any known oxygen getter material, which is preferably carbon in the form of coke. Sufficient oxygen getter material is included in the furnace 24 in order to insure that oxide formation does not occur. In one form of the invention, a blanket of carbon is used to cover the entire feedstock. In furtherance of this purpose of preventing oxide formation, the furnace 24 is flooded with argon or nitrogen gas so that the atmosphere of the furnace 24 is maintained in a reduction atmosphere. In preferred form, the gas is in the form of an argon blanket. Argon is preferred rather than nitrogen, since there may be unknown materials in the feed stock which can potentially react with nitrogen to form NOX, cyanides, or the like. The furnace 24 is then operated at several heating levels as described below, after which solidified cadmium cubes are generated at 26 as well as producing a nickel-iron residue 28.

The nickel-iron residue is cadmium free and will pass the Toxic Characteristic Leaching Procedure (TCLP) test as set forth by the Environmental Protection Agency. The cadmium cubes or blocks produced at 26 are of sufficient quality so as to be reusable directly in the nickel-cadmium battery manufacturing process without further refinement or treatment.

The exhaust gas from the furnace 24 is directed through a particulate separator 30 which is to separate the particular matter in a collector 32. The ash and particulate matter is separated and collected in the collector 32 and then disposed of appropriately. The separator 30 and collector 32 may be separate units or one single unit, depending on individual choice. The remaining exhaust gas is then directed through a water scrubbing device 34 which results in two effluent streams, a clean off-gas 36 which is vented to the atmosphere, and a scrubber water 38 which is directed to a standard waste water treatment plant 20 and is then discarded.

Referring to the retort furnace stage 24 of the overall process 10, once the feedstock is disposed therein, and once the oxygen getter material is added, and the atmosphere of the furnace is flooded with argon so as to create an argon atmosphere, the furnace is increased preferably to a temperature of approximately 200°-300° C. for an effective period of time so as to vaporize and remove free water within the furnace 24. This vapor is then directed to the separator 30 as are all of the off-gasses from the furnace 24. In a more preferred form, first temperature utilized for the furnace 24 in the present invention is approximately 250°-300° C. and is maintained at that level for approximately at least 1-2 hours. Once the free water has been evaporated, the temperature of the furnace 24 is then further elevated to a range of 500°-800° C. and maintained at that level for an effective period of time to volatilize molecular hydrogen so as to remove the oxygen therefrom as well as to volatilize non-metallic substances such as plastic and the like. These off-gasses are then vented through the separator 30 as previously described. In more preferred form, a temperature of 500°-800° C. is maintained for at least approximately 1-2 hours in order to insure complete volatilization of the molecular water and non-metallic substances.

At this juncture, the furnace 24 is then further increased to a temperature range of at least 900° C. and preferably approximately 900°-1,000° C., and more preferably at least 950° C., for an effective period of time in order to volatilize all of the cadmium present in the feedstock within the furnace 24. In a more preferred form, at least 950° C. is needed to be maintained for at least two hours in order to fully volatilize all of the cadmium in the furnace 24, although the time period will vary depending on the amount and makeup of the feedstock.

The volatilized or vaporized cadmium is then directed to a throat portion of the retort furnace 24 and to a condensing chamber or tube at which point the cadmium is condensed into molds contained within the chamber by reducing the temperature thereof preferably from about 400° C. to approximately 200°-135° C. The cadmium goes from a gaseous stage to a liquid stage within the molds to a solid stage to form the cadmium cubes 26 referred to previously. The temperature is reduced to about 320° C. at the mold point in order to maintain the Cd in liquid form so that any ash contaminants will rise to the top of the liquid Cd. The temperature is eventually reduced to about 135°-200° C. when it is desired to solidify the liquid Cd. Too fast of a temperature reduction in the condensing chamber 30 will generate Cd dust, which is not desirable. Once the cadmium cubes 26 are formed, they are removed from the molds. The nickel-iron residue is also recovered from the retort furnace 24.

Referring now to FIG. 2, a device 50 is disclosed for achieving the generation of cadmium and Cd-free nickel-iron residue. Referring to FIG. 2, the furnace 24 includes an interior chamber 52 which has a gas input port 54 and a gas output port 56 having a throat portion 58. An input area 60 is provided in order to enable feedstock 61 of the type as previously described to be inserted within the chamber 52. An argon or nitrogen gas source 62 is provided and is preferably in the form of an argon gas tank. A metering valve 64 is provided along the tubing 66 which interconnects the argon gas source 62 with the gas inlet port 54. The metering valve 64 permits metering of the argon gas from the tank 62 into the chamber 52 in order to provide and maintain an argon atmosphere within the chamber 52 at all times.

Once the feedstock 61 is inserted within the input opening 60, an oxygen getter 67 as discussed above is then introduced through the input opening 60. In one form of the invention, the getter material 67 covers the feedstock 61 in its entirety. The purpose of the oxygen getter material 67 is to in fact react with any oxygen generated from the feedstock 61 so as to prevent the formation of oxides. In preferred form, the oxygen getter 67 utilized with the present invention is carbon preferably in the form of coke. In preferred form, approximately 1–2 ounces of carbon is added for every ten pounds of feedstock material 61 within the chamber 52. It should be noted, however, that excess amount of carbon results only in approximately 20% utilization of the carbon with 80% of the carbon being available for recycling and reuse within the process of the invention. If a large amount of filter cake is used as the feedstock 61, then an excess amount of carbon particles 67 is not desirable since separation between the two for reuse of the carbon can be difficult.

Once the feedstock 61, carbon 67 and argon gas are introduced within the chamber 52, the furnace 24 is operated as previously described with respect to the several temperature ranges. The off-gasses are directed through the throat 58 into the condensing chamber 68 and then through the rest of the system. When the furnace 24 reaches its third heating stage wherein cadmium vapor is off-gassed, the cadmium vapor is directed through the throat 58 into the condensing chamber 68, preferably in the form of an integral tube. A thermocouple 70 monitors and maintains the temperature of the condensing chamber 68 at the desired level. When the cadmium vapor is introduced into the chamber 68, the temperature is maintained at about 400° C. The temperature is then dropped along the length of the tube 68 to about 300°–320° C. at the mold tray 72 to about 135°–200° C. at condenser outlet 73. Cadmium is condensed within the tube 68 and accumulates in a mold tray 72 to form cadmium cubes or blocks 74. The condensation of the cadmium vapor within the condensing chamber 68 is achieved by reducing the temperature across the length thereof as just described.

As the cadmium is condensed within the mold trays 72, the remaining exhaust gas is directed into an ash collector 76. The ash collector 76 may be in a form of a cyclone or any other type of well known particulate filtration and collection device so as to accumulate plastic particulate materials, ash particulates and the like at the bottom 78 of the collector 76. In preferred form, the separator 76 is a velocity reduction stack having baffles 79 therein for impeding the flow of the exhaust gas therethrough. As this occurs, the velocity of the gas is reduced, and this reduces its temperature. In so doing, the ash 78 falls out and collects at the bottom. The temperature thereof is monitored and regulated by a thermocouple 80.

The remaining exhaust gas is then directed through piping 82 into any standard exhaust gas cooling device 84 and then through piping 86 into an air handling system 88 which is well known in the art and will not be further described herein. The temperature of the exhaust gas cooling device 84 is monitored and maintained by a thermocouple 90. The exhaust gas cooling device 84 may be any standard water bath device known to the art.

As previously mentioned, the carbon or coke 67 that is introduced into the chamber 52 is preferably evenly distributed over the scrap material mass 61 placed therewithin. This is so that any oxygen generated therefrom is immediately bound up in the form of carbon monoxide and/or carbon dioxide so as to prevent the formation of other oxides within the chamber 52. The argon gas, of course, also assists in preventing oxidation reactions from occurring by providing the argon atmosphere within the chamber 52.

Any type of scrap material containing cadmium, cadmium and nickel, and the like may be introduced into the chamber 52. Once the entire process as described above has taken place, charred nickel-iron material remains within the chamber 52. All plastic, cadmium and other metals and non-metallic materials have been removed by the process of the invention, and the result is a mass of nickel-iron material containing approximately 35% nickel.

In addition to spent batteries, process residues from battery processing systems may also be introduced into the chamber 52. These process residues generally include nitrates which have fallen away from electrode plates during the production of electroplate. Moreover, base metals or hydroxides can also be included in this process residue. These residues are dewatered as indicated in FIG. 1, and then injected into the chamber 52. These are generally in the form of "filtered cakes" which actually are approximately 80% water but nonetheless are still dry to the touch. These filter cakes are then dried at step 22 prior to introduction and into the chamber 52.

The time and temperature of each of the heating stages of the furnace 24 may vary somewhat within the parameter given above during the retort process depending on the actual mix of the type of starting materials introduced into the chamber 52.

A significant advantage of the present invention is that the furnace chamber 52 and condenser 68 are preferably a one-piece, integral unit requiring no moving parts for operation. In fact, the entire device 50 is without moving parts and requires no additional secondary operations. Thus, the device and method of the invention are very simple, economic yet incredibly effective in recovering Cd metal and Ni-iron metal ore. Moreover, while a batch process is illustrated, a continuous process is also envisioned.

EXAMPLE

To begin the process, battery cells and cell parts were reduced in size and opened to expose cell contents by shredding and chopping. Eighty pounds of prepared cells and cell parts were placed in the retort, and one and one half pounds of carbon granules were also added. The retort was then closed and connected to the other process devices such as argon supply tube, ash collector, exhaust gas cooling chamber, and temperature sensing devices. The system was then started by turning on the regulated heat source to the oven which supplies thermal energy to the retort and its contents.

The pyrometallurgical process was performed in three distinct thermal cycles. The first thermal cycle removed free water and other moisture from the feedstock in the retort. The second cycle removed molecular water, oxygen and other volatile substances. The third cycle vaporized the cadmium so that it condensed as pure metal in the condenser chamber. During the three thermal cycles, process gases such as vapors, argon, carbon-oxygen, and other volatiles passed from the retort through the condenser and ash collector into and through the exhaust gas cooling chamber and thereafter through the air handling equipment. The first thermal cycle period was approximately 1.5-2.0 hours at a temperature range of 200° C.-300° C. The second thermal cycle period was then run for approximately 2-2.5 hours at a graduated temperature range of 500°-700° C. The third thermal cycle period was then operated for approximately 2.5-3.5 hours at a temperature range of 900°-1100° C. During this cycle, the temperature of the exhaust stream exiting the condenser was controlled to a temperature range of 150°-250° C.

At the end of the third heating cycle, the argon gas, thermal energy and exhaust gas cooling water supplies were stopped. The retort was permitted to cool to safe operating and handling temperatures whereupon the pure cadmium blocks and nickel-iron residue were removed to other battery manufacturing processes or to other purposes.

The cadmium blocks removed from the condenser weighed approximately 11 pounds. The cadmium was roughly 99.9998% pure. The nickel-iron byproduct weighed approximately 50 pounds, of which approximately 24.5 pounds was nickel. The waste generated was water and ash weighing approximately 19 pounds, of which one to three percent was ash. Altogether this process required roughly eight hours.

The cadmium generated by this process was pure enough to be used in battery manufacturing or other purposes. The nickel generated was mixed or alloyed with other metals such as iron or cobalt. The nickel-iron byproduct passed the toxic leachate characteristic process (TLCP) tests. The nickel-iron may be used in battery manufacturing or further refined to isolate nickel from the byproduct.

As can be seen from the above, the pyrometallurgical metal recovery device and process of the present invention provide a technique for effectively recovering cadmium and nickel metals from scrap materials containing those metals as well as other residual metal and nonmetal substances. The present invention provides cadmium-metal recovery of sufficient quality and purity such that the cadmium metal may be immediately reused in nickel-cadmium battery manufacturing processes. Moreover, the residual nickel-iron residue is of sufficient quality that it can be sold to metal refineries for its nickel content or may be melted down for further processing. As a result of the present invention, the environmental impact of nickel-cadmium secondary cells is significantly reduced by removing the cadmium and nickel metals from any materials which need to be discarded. Since cadmium disposal is of particular environmental concern, the recovery of the cadmium metal significantly improves the recyclability of the nickel-cadmium secondary batteries. Moreover, sufficient cadmium can be regenerated from spent cells and discarded process materials so as to provide substantially all of the cadmium requirements for the production of new nickel-cadmium batteries, thereby reducing environmental impact required from the generation of new raw cadmium material. Thus, as a result of the generation of in-house cadmium sources as well as the income derived from the sale of nickel-iron residue, the present invention provides significant costs savings as well as the elimination of significant environmental problems.

The foregoing description and the illustrative embodiments of the present invention have been shown in the drawings and described in detail in varying modifications and alternate embodiments. It should be understood, however, that the foregoing description of the invention is exemplary only, and that the scope of the invention is limited only to the claims as interpreted in view of the prior art. Moreover, the invention illustratively disclosed herein suitably may be practiced in the absence of any element which is not specifically disclosed herein.

The embodiments of the invention in which an exclusive property or privilege is claimed are defined as follows:

1. A process for recovering cadmium and nickel metals from Ni-Cd battery and processing scrap material containing nickel, cadmium, free water, molecular water, nonmetallic substances and other substances, said process comprising the steps of:
    depositing said scrap material in a furnace;
    adding an effective amount of an oxygen getter in said furnace to inhibit oxide formation;
    introducing and maintaining a gas selected from the group consisting of argon and nitrogen into the atmosphere of said furnace;
    heating said furnace for an effective period of time to evaporate said free water;
    increasing and maintaining the temperature of said furnace to approximately 500°-800° C. for an effective period of time to volatilize said molecular water and said nonmetallic substances;
    raising the temperature of said furnace to greater than approximately 900° C. for an effective period of time to vaporize cadmium from said scrap material;
    directing said vaporized cadmium to a chamber connected to said furnace;
    condensing and solidifying said cadmium vapor disposed within said chamber by decreasing the temperature of said cadmium vapor within said chamber;
    recovering said solidified cadmium from said chamber; and
    recovering said nickel from inside said furnace.

2. The process as claimed in claim 1, wherein said oxygen getter comprises carbon.

3. The process as claimed in claim 2, wherein said carbon in the form of coke.

4. The process as claimed in claim 3, wherein the amount of coke utilized within said furnace comprises approximately 1-2 ounces per ten pounds of scrap material disposed in said furnace.

5. The process as claimed in claim 4, wherein approximately up to 80% of said coke is reusable in subsequent process steps.

6. The process as claimed in claim 1, wherein said gas comprises argon.

7. The process as claimed in claim 1, wherein said scrap material is selected from the group consisting of spent or scrap nickel-cadmium batteries, unused electrode materials for nickel-cadmium batteries, nickel-cadmium process residues, metallic hydroxide sludges, and mixtures thereof.

8. The process as claimed in claim 1, wherein said free water is evaporated from said scrap material by heating said furnace to approximately 200°-300° C. for at least one-two hours.

9. The process as claimed in claim 1, wherein the 500°-800° C. temperature of said furnace is maintained for at least one-two hours.

10. The process as claimed in claim 1, wherein said cadmium is vaporized by increasing the temperature of said furnace to at least approximately 950° C. for at least approximately two hours.

11. The process as claimed in claim 1, thereby producing residual gas and residual particles after said cadmium condensing and solidifying step and including the steps of directing said residual gas remaining in said cadmium condensing chamber after condensation and solidification of said cadmium through ash collection means adapted to separate and collect said residual particles and is thereafter directed to means for cooling said residual exhaust gas prior to venting to the atmosphere.

12. A pyrometallurgical process for the recovery of cadmium and nickel metals in a retort furnace from scrap material including spent or scrap nickel-cadmium battery cells, unused positive or negative electrode materials, nickel-cadmium process residues, and filter cakes, said scrap materials containing nickel, cadmium, iron, cobalt, free water, molecular water and other nonmetallic substances, said process comprising the steps of:

depositing said scrap material in said retort furnace;

maintaining an atmosphere of a gas selected from the group consisting of argon and nitrogen within said furnace;

adding a layer of carbon over said scrap material to prevent oxide formation;

heating said furnace to approximately 2000°-300° C. to evaporate said free water;

increasing the temperature of said furnace to approximately 500°-800° C. to volatilize said molecular water and nonmetallic substances;

elevating the temperature of said furnace to greater than 900° C. to vaporize cadmium from said scrap material directing said volatilized cadmium to an integral condensing chamber containing a mold;

decreasing a temperature within said condensation chamber to condense said cadmium vapor into said mold and solidify the same therewithin;

directing exhaust gasses from said condensing chamber into an ash collector;

recovering the solidified residual cadmium; and recovering said nickel from said furnace.

13. The process as claimed in claim 12, wherein said carbon is in the form of coke in the amount of approximately 1-2 ounces per ten pounds of scrap material.

14. The process as claimed in claim 12, wherein a substantial amount of said carbon is recycled.

15. The process as claimed in claim 12, wherein said gas atmosphere comprises argon gas.

16. The process as claimed in claim 12, wherein each furnace heating stage occurs for at least approximately 1-2 hours.

17. A device for recovering cadmium and nickel metals from Ni-Cd battery and processing scrap material containing nickel, cadmium, iron and other nonmetallic substances, said device comprising:

a furnace defining an interior chamber and having material inlet means for inserting said scrap material therein, gas inlet means, and gas outlet means;

means for injecting and maintaining a gas atmosphere of a gas selected from the group consisting of argon and nitrogen into said furnace chamber through said gas inlet means;

means for providing an oxygen getter in said furnace chamber to overlay said scrap material therein to prevent oxide formation;

means for controlling the temperature of said furnace chamber in sequential fashion to selectively off-gas free water, then molecular water and non-metallic substances, and then cadmium vapor;

condenser means connected to said gas outlet means and including mold means for receiving condensed cadmium;

means for controlling the temperature of said condenser means to condense and then solidify into said mold means cadmium vapor received from said furnace chamber; and means for receiving exhaust gas from said condenser means for filtering and collecting particulate ash therein.

18. The device as claimed in claim 17, further including means for receiving and cooling the filtered exhaust gas from said ash collection means.

19. The device as claimed in claim 17, wherein said gas injection and maintaining means includes an argon gas source and means for metering said argon gas into said furnace chamber to create an argon atmosphere within said chamber.

20. The device as claimed in claim 17, wherein said means for providing an oxygen getter comprises means for providing carbon inserted into said furnace chamber through said scrap material inlet means.

21. The device as claimed in claim 20, wherein said means for providing carbon comprises means for providing coke in the amount of approximately 1-2 ounces per ten pounds of scrap material present in said furnace chamber.

22. The device as claimed in claim 17, wherein said condenser means comprises a condenser tube integral with said furnace chamber and open to said gas outlet means, said condenser tube being adapted to receive vaporized cadmium from said furnace chamber.

23. The device as claimed in claim 22, wherein said mold means comprises removable cadmium metal mold members disposed in the bottom portion of said condenser tube for forming solid cadmium metal upon the reduction of temperature of said condenser tube and the condensation of cadmium therein.

24. The device as claimed in claim 17, wherein said furnace chamber temperature control means includes means for providing and maintaining a first heating stage of said furnace chamber to approximately 200°-300° C. to evaporate free water, a second heating stage of increased temperature to approximately 500°-800° C. to volatilize molecular water and non-metallic substances, and a third heating stage to greater than 900° C. to vaporize cadmium from said scrap material.

25. The device as claimed in claim 24, wherein said condenser temperature controlling means is adapted to vary the internal temperature of said condenser means from approximately 400° C. adjacent said furnace gas outlet means to approximately 135°-250° C. adjacent said exhaust gas receiver means.

* * * * *